US009501979B2

(12) United States Patent
Nishio

(10) Patent No.: US 9,501,979 B2
(45) Date of Patent: Nov. 22, 2016

(54) IMAGE DISPLAY APPARATUS AND CONTROL METHOD THEREOF

(71) Applicant: CANON KABUSHIKI KAISHA, Tokyo (JP)

(72) Inventor: Taisuke Nishio, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 14/353,638

(22) PCT Filed: Dec. 6, 2012

(86) PCT No.: PCT/JP2012/007813
§ 371 (c)(1),
(2) Date: Apr. 23, 2014

(87) PCT Pub. No.: WO2013/094140
PCT Pub. Date: Jun. 27, 2013

(65) Prior Publication Data
US 2014/0232764 A1 Aug. 21, 2014

(30) Foreign Application Priority Data

Dec. 19, 2011 (JP) .................. 2011-277625
Nov. 26, 2012 (JP) .................. 2012-257472

(51) Int. Cl.
*G09G 5/00* (2006.01)
*G09G 3/34* (2006.01)
(Continued)

(52) U.S. Cl.
CPC .......... *G09G 3/3406* (2013.01); *G02F 1/1336* (2013.01); *G09G 3/3426* (2013.01);
(Continued)

(58) Field of Classification Search
CPC ................ G09G 1/00; G09G 3/3426; G09G 2360/16; G09G 2320/0646; G09G
(Continued)

(56) References Cited

U.S. PATENT DOCUMENTS 8,207,953 B2   6/2012   Yamamura et al.
8,531,383 B2   9/2013   Toshima et al.
(Continued)

FOREIGN PATENT DOCUMENTS

CN   102057420 A    5/2011
EP   2 378 511 A1   10/2011
(Continued)

OTHER PUBLICATIONS

European Search Report issued in counterpart European Patent Application No. 12860344.6 mailed Jul. 10, 2015.
(Continued)

*Primary Examiner* — Michael Faragalla
(74) *Attorney, Agent, or Firm* — Fitzpatrick, Cella, Harper & Scinto

(57) ABSTRACT

The present invention in its first aspect provides an image display apparatus capable of controlling, for each block obtained by dividing a region of a screen, a backlight emission brightness based on image data of an inputted frame. The image display apparatus includes: a detecting unit that detects a block in which a predetermined object is displayed; a determining unit that determines an object block that is a block in which a background and the predetermined object are displayed based on a detection result by the detecting unit; and a control unit that controls a backlight emission brightness for each block. The control unit approximates a backlight emission brightness of the object block to a backlight emission brightness of another block in which the background is displayed.

21 Claims, 8 Drawing Sheets

(51) Int. Cl.
*G02F 1/1335* (2006.01)
*G09G 3/36* (2006.01)

(52) U.S. Cl.
CPC ..... *G02F 2001/133601* (2013.01); *G09G 3/36* (2013.01); *G09G 2320/062* (2013.01); *G09G 2320/064* (2013.01); *G09G 2320/066* (2013.01); *G09G 2320/0613* (2013.01); *G09G 2320/0646* (2013.01); *G09G 2320/0686* (2013.01); *G09G 2320/103* (2013.01); *G09G 2330/021* (2013.01); *G09G 2340/16* (2013.01); *G09G 2354/00* (2013.01); *G09G 2360/16* (2013.01)

(58) Field of Classification Search
CPC .......... 2320/064;G09G 3/3406; G09G 2320/0626; G06F 1/00
See application file for complete search history.

(56) References Cited

U.S. PATENT DOCUMENTS

| | | | |
|---|---|---|---|
| 2010/0220048 | A1 | 9/2010 | Yamamura et al. |
| 2010/0265405 | A1 | 10/2010 | Toshima et al. |
| 2010/0295879 | A1 | 11/2010 | Tanaka et al. |
| 2010/0328363 | A1 | 12/2010 | Nakanishi |
| 2011/0063276 | A1 | 3/2011 | Tan et al. |
| 2011/0169873 | A1 | 7/2011 | Sano et al. |
| 2011/0298839 | A1 | 12/2011 | Nakanishi |

FOREIGN PATENT DOCUMENTS

| | | | |
|---|---|---|---|
| JP | 2002-099250 A | 4/2002 | |
| JP | 2005-321424 A | 11/2005 | |
| JP | 2010-250173 A | 11/2010 | |
| JP | 2010-271393 A | 12/2010 | |
| JP | 2011-013294 | 1/2011 | |
| JP | 2011-013294 A | 1/2011 | |
| JP | 2011-145405 A | 7/2011 | |
| JP | EP 2378511 A1 * | 10/2011 | ........... G09G 3/3426 |
| JP | 2011-232483 | 11/2011 | |
| JP | 2011-232483 A | 11/2011 | |

OTHER PUBLICATIONS

Notification Concerning Transmittal of the International Preliminary Report on Patentability (PCT/IB/326) dated Jul. 3, 2014, issued in counterpart PCT Application No. PCT/JP2012/007813, International Preliminary Report on Patentability (PCT/IB/373) dated Jun. 24, 2014, and Written Opinion of the International Searching Authority (PCT/ISA/237) dated Feb. 5, 2013.
Korean Office Action issued in counterpart Korean Patent Application No. 10-2014-7019588 mailed Apr. 21, 2015.
Korean Office Action issued in counterpart Korean Patent Application No. 10-2014-7019588, mailed Dec. 31, 2015.
Chinese Office Action issued in counterpart Chinese Patent Application No. 201280062997.2, mailed Dec. 22, 2015.

* cited by examiner

IMAGE DISPLAY APPARATUS AND CONTROL METHOD THEREOF

TECHNICAL FIELD

The present invention relates to an image display apparatus and a control method thereof.

BACKGROUND ART

A liquid crystal display apparatus is known which uses a technique for locally reducing the emission brightness of a backlight (a backlight emission brightness) based on a brightness feature amount of inputted image data. According to this technique, the backlight emission brightness is reduced in dark regions of an image and unacceptably bright black levels are suppressed. In addition, the backlight emission brightness is controlled so that a display brightness is maintained in bright regions of the image. Accordingly, a contrast-improving effect is produced. For example, such a technique is disclosed in Patent Literature (PTL) 1.

In addition, a technique is proposed for reducing the backlight emission brightness of regions other than a region in which a cursor is displayed to below a backlight emission brightness of the region in which the cursor is displayed (Patent Literature (PTL) 2). According to this technique, a power consumption reduction effect can be produced. Furthermore, a technique is proposed for maintaining the emission brightness of an entire backlight when displaying an OSD image to a brightness upon start of displaying of the OSD image (Patent Literature (PTL) 3). According to this technique, the display brightness of the OSD image can be stabilized.

CITATION LIST

Patent Literature

PTL 1

Japanese Patent Application Laid-open No. 2002-99250

PTL 2

Japanese Patent Application Laid-open No. 2011-13294

PTL 3

Japanese Patent Application Laid-open No. 2005-321424

SUMMARY OF INVENTION

Technical Problem

However, when a backlight emission brightness is controlled for each region based on a brightness feature amount of inputted image data, a variation in display brightness may occur due to an overlapping display of an auxiliary object, such as a mouse cursor or a marker. More precisely, even though a displayed image remains unchanged, the display brightness specifically varies in a region surrounding the cursor, and image quality deteriorates in a region surrounding the cursor. Such a variation in the display brightness creates a feeling of discomfort in a user. In other words, such a variation in display brightness creates a feeling of interference in terms of image quality.

The present invention provides an image display apparatus and a control method thereof capable of suppressing a specific variation in display brightness around a predetermined object when the object is displayed.

Solution to Problem

The present invention in its first aspect provides an image display apparatus capable of controlling, for each block obtained by dividing a region of a screen, a backlight emission brightness based on image data of an inputted frame. The image display apparatus comprises: a detecting unit that detects a block in which a predetermined object is displayed; a determining unit that determines an object block that is a block in which a background and the predetermined object are displayed based on a detection result by the detecting unit; and a control unit that controls a backlight emission brightness for each block. The control unit approximates a backlight emission brightness of the object block to a backlight emission brightness of another block in which the background is displayed.

The present invention in its second aspect provides an image display apparatus capable of controlling, for each block obtained by dividing a region of a screen, a backlight emission brightness based on image data of an inputted frame. The image display apparatus comprises a detecting unit that detects a block in which a predetermined object is displayed; a determining unit that determines an object block that is a block in which a background and the predetermined object are displayed based on a detection result by the detecting unit; and a control unit that controls a backlight emission brightness for each block. The control unit controls a backlight emission brightness of the object block based on a backlight emission brightness of a block in which the background is displayed but the predetermined object is not displayed.

The present invention in its third aspect provides a control method of an image display apparatus capable of controlling, for each block obtained by dividing a region of a screen, a backlight emission brightness based on image data of an inputted frame. The control method comprises a detecting step of detecting a block in which a predetermined object is displayed; a determining step of determining an object block that is a block in which a background and the predetermined object are displayed based on a detection result in the detecting step; and a control step of controlling a backlight emission brightness for each block. In the control step, a backlight emission brightness of the object block is approximated to a backlight emission brightness of another block in which the background is displayed.

The present invention in its fourth aspect provides a control method of an image display apparatus capable of controlling, for each block obtained by dividing a region of a screen, a backlight emission brightness based on image data of an inputted frame. The control method comprises: a detecting step of detecting a block in which a predetermined object is displayed; a determining step of determining an object block that is a block in which a background and the predetermined object are displayed based on a detection result in the detecting step; and a control step of controlling a backlight emission brightness for each block. In the control step, a backlight emission brightness of the object block is controlled based on a backlight emission brightness of a block in which the background is displayed but the predetermined object is not displayed.

Advantageous Effects of Invention

According to the present invention, a specific variation in display brightness around a predetermined object when the object is displayed can be suppressed. In other words, a deterioration of image quality around the predetermined object can be suppressed, and image quality of a displayed image can be improved.

Further features of the present invention will become apparent from the following description of exemplary embodiments with reference to the attached drawings.

DESCRIPTION OF EMBODIMENTS

First Embodiment

Hereinafter, a liquid crystal display apparatus (image display apparatus) and a control method thereof according to a first embodiment of the present invention will be described.

Figure 3:
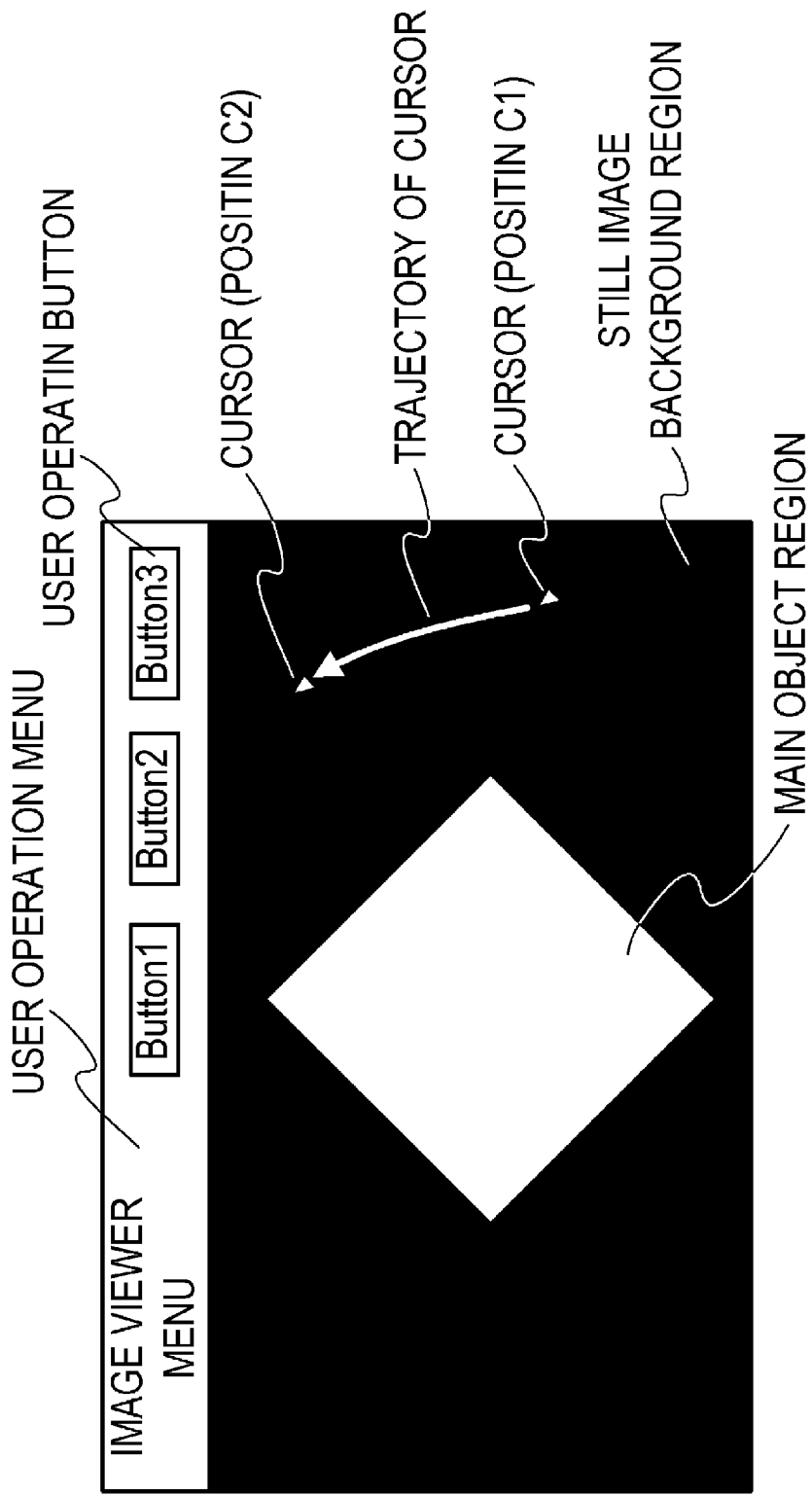
FIG. 3 is a diagram showing an example of a displayed image of a liquid crystal display apparatus according to the first embodiment.

For example, as shown in FIG. 3, the liquid crystal display apparatus according to the present embodiment displays an image including a still image constituted by a main object region and a still image background region, a user operation menu, and a predetermined object. For example, the predetermined object is an auxiliary object that assists user operations. Examples of an auxiliary object include a cursor that moves in response to a mouse operation by a user.

In addition, the liquid crystal display apparatus according to the present embodiment has a configuration in which a backlight emission brightness can be controlled per block based on image data of an inputted frame so that the backlight emission brightness of a bright region in the image is higher than the backlight emission brightness of a dark region in the image. A backlight emission brightness is an emission brightness (an emission luminance) of a backlight. A block is a region obtained by dividing a region of a screen.

Figure 1:
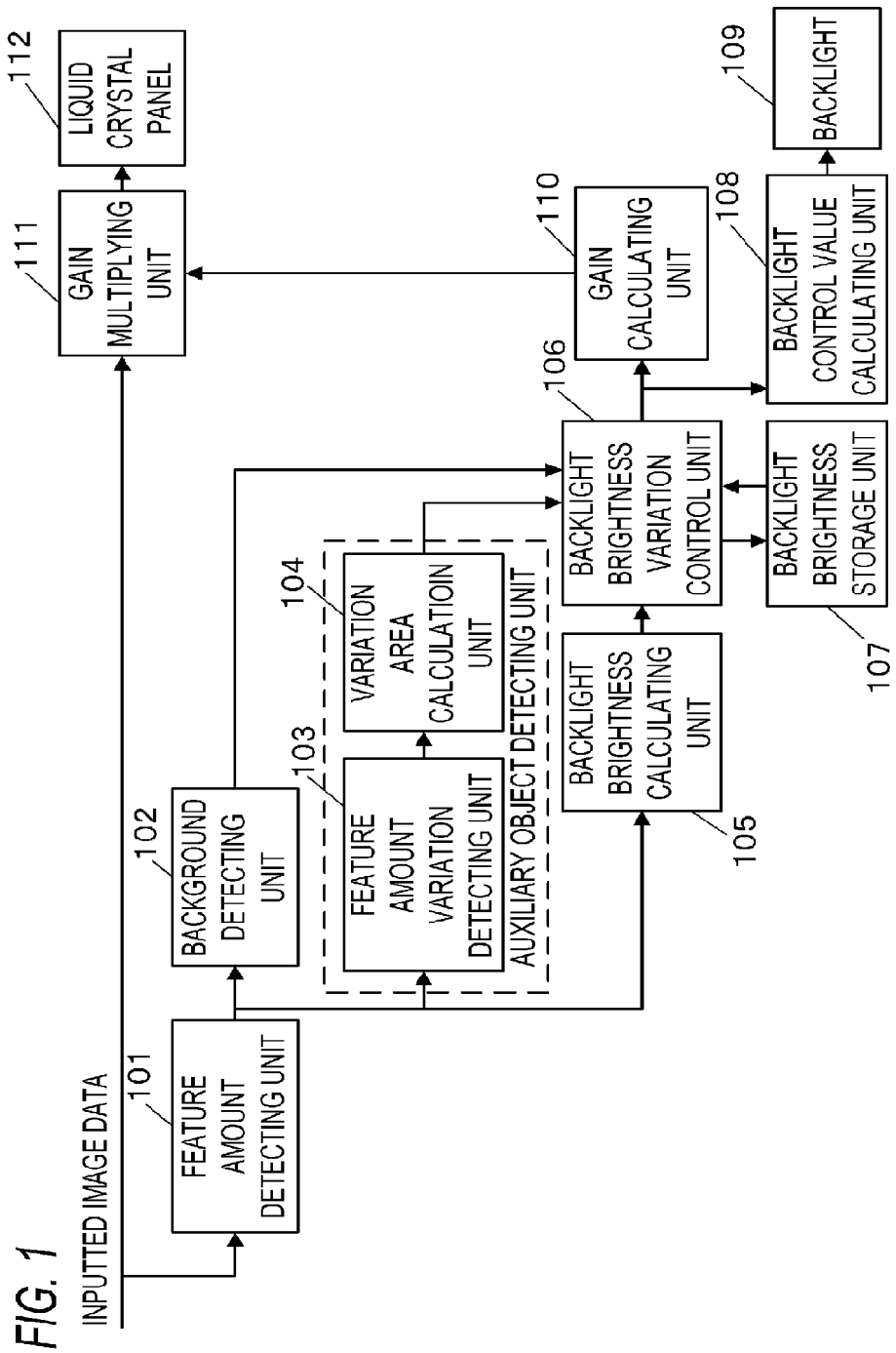
FIG. 1 is a block diagram showing an example of a functional configuration of a liquid crystal display apparatus according to a first embodiment.

FIG. 1 is a block diagram showing an example of a functional configuration of the liquid crystal display apparatus according to the present embodiment.

A feature amount detecting unit 101 detects and outputs a brightness feature amount of inputted image data for each block.

When image data of an inputted frame (current frame) includes a background image, a background detecting unit 102 detects a block in which a background is displayed (background-displaying block). Specifically, for each block, the background detecting unit 102 determines whether or not the block is a background-displaying block and outputs a result of the determination. In the present embodiment, a dark region of an image is to be used as a background region (still image background region).

When image data of the current frame includes image data of an auxiliary object, an auxiliary object detecting unit (a feature amount variation detecting unit 103 and a variation area calculating unit 104) detects a block in which the auxiliary object is displayed. Moreover, in the present embodiment, an image of an auxiliary object is assumed to be brighter than a background image. Specifically, for each block, the feature amount variation detecting unit 103 determines whether or not a brightness feature amount of the block has varied over time (from a frame immediately preceding the current frame (a preceding frame) to the current frame), and outputs a result of the determination. The variation area calculating unit 104 calculates the total area (number) of blocks in which it is determined that the brightness feature amount has varied over time by the feature amount variation detecting unit 103. Subsequently, based on the calculation result (the total area of blocks in which it is determined that the brightness feature amount has varied over time), the variation area calculating unit 104 determines whether or not the variation of the brightness feature amount over time detected by the feature amount variation detecting unit 103 is attributable to displaying an auxiliary object. Specifically, when the total area of blocks in which it is determined that the brightness feature amount has varied over time is smaller than a predetermined threshold, the variation area calculating unit 104 determines that the variation of the brightness feature amount over time is attributable to displaying an auxiliary object. When the variation area calculating unit 104 determines that the variation of the brightness feature amount over time is attributable to displaying an auxiliary object, the variation area calculating unit 104 determines that a block in which it is determined that the brightness feature amount has varied over time is a block in which the auxiliary object is displayed and outputs a result of the determination. In this case, it is assumed that an area of an auxiliary object, such as a cursor, is relatively small and that a threshold is set which corresponds to an area of the auxiliary object assumed in advance.

For each block, a backlight brightness calculating unit 105 calculates an emission brightness (a backlight emission brightness) of a backlight 109 based on a brightness feature amount of image data of the current frame. Specifically, the backlight emission brightness is calculated for each block so that a block of a bright image has a higher backlight emission brightness than a block of a dark image.

A backlight brightness variation control unit 106 determines whether or not the auxiliary object is displayed in a background-displaying block based on a detection result by the background detecting unit 102 and a detection result by the auxiliary object detecting unit (a determination of an object block that is a block in which the background and the auxiliary object are displayed). In addition, the backlight brightness variation control unit 106 controls the backlight emission brightness based on a result of the determination regarding whether or not the auxiliary object is displayed in a background-displaying block. Specifically, when it is determined that the auxiliary object is displayed in a background-displaying block, the backlight brightness variation control unit 106 approximates the backlight emission brightness of a background-displaying block (object block) in which the auxiliary object is displayed to the backlight emission brightness of other background-displaying blocks.

In the present embodiment, when it is determined that the auxiliary object is displayed in a background-displaying block (when the object block exists), the backlight brightness variation control unit 106 adjusts the backlight emission brightness of all blocks so as to equal the backlight emission brightness of the blocks in a previous frame. Specifically, the backlight brightness variation control unit 106 adjusts the backlight emission brightness of each of all blocks so as to equal the backlight emission brightness of the blocks in the preceding frame. In other words, in the present embodiment, when it is determined that the auxiliary object is displayed in a background-displaying block, the backlight brightness variation control unit 106 performs control so that emission brightness of the entire backlight does not vary over time. Accordingly, the backlight emission brightness of the background-displaying block in which the auxiliary object is displayed becomes equal to the backlight emission brightness of the same block when the auxiliary object is not displayed. As a result, the backlight emission brightness of the background-displaying block in which the auxiliary object is displayed can be approximated to the backlight emission brightness of other background-displaying blocks.

Moreover, a previous frame is not limited to a preceding frame (a frame immediately preceding the current frame). For example, the previous frame may precede the current frame by any number of frames as long as the auxiliary object is not displayed in the frame.

Moreover, in the present embodiment, the backlight brightness variation control unit 106 performs the emission brightness control described above by controlling a backlight brightness storage unit 107 described below.

The backlight brightness storage unit 107 stores the backlight emission brightness of each block calculated by the backlight brightness calculating unit 105. In addition, the backlight brightness storage unit 107 outputs a stored backlight emission brightness of each block.

A backlight control value calculating unit 108 calculates and outputs a control value for each block so that a light source (a light source of the backlight 109) of the block emits light at the backlight emission brightness of the same block outputted from the backlight brightness storage unit 107. For example, when the backlight emission brightness of each block is controlled by pulse-width modulation, a pulse width value is outputted for each block as a control value.

The backlight 109 (backlight module) has a light source (one or more light sources) for each block. The light sources of the respective blocks can be controlled independently. The backlight 109 causes the light source of each block to emit light based on the control value of the block as calculated by the backlight control value calculating unit 108. In other words, the backlight 109 causes the light source of each block to emit light at the backlight emission brightness of the same block outputted from the backlight brightness storage unit 107.

A gain calculating unit 110 calculates, for each pixel, a brightness (display brightness; first display brightness) on a display screen (screen) of the liquid crystal display apparatus in a case where light is emitted by the backlight 109 based on the control value of each block as calculated by the backlight control value calculating unit 108. In addition, the gain calculating unit 110 calculates a multiplier value (gain) so that a maximum value of the first display brightness is consistent with a maximum value of a display brightness (second display brightness) in a case where the light is emitted by the backlight 109 at a predetermined emission brightness. Moreover, the display brightness may be calculated on a per-block basis instead of on a per-pixel basis. A gain multiplying unit 111 multiplies image data of the current frame (respective pixel values of the current frame) by the gain calculated by the gain calculating unit 110, and outputs image data of the current frame that has been multiplied by the gain. A liquid crystal panel 112 (LCD module) has a plurality of liquid crystal elements. The transmittance of the plurality of liquid crystal elements is controlled based on image data (the image data multiplied by the gain) inputted to the liquid crystal panel 112. An image is displayed as light from the backlight 109 is transmitted through the liquid crystal panel 112 (the plurality of liquid crystal elements described above).

Figure 8:
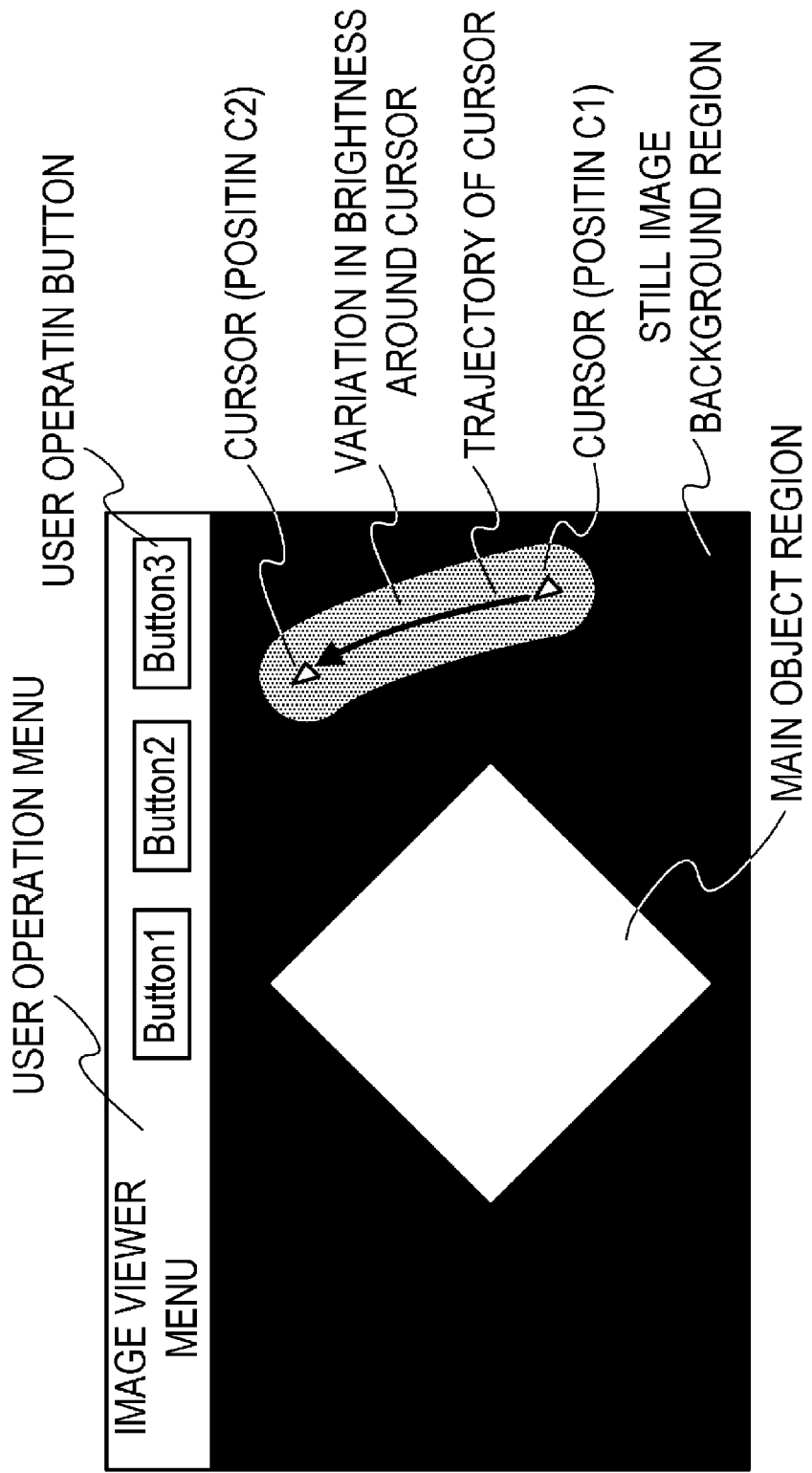
FIG. 8 is a diagram showing an example of a displayed image of a conventional liquid crystal display apparatus.

FIG. 8 shows an example of a displayed image in a conventional liquid crystal display apparatus that controls the backlight emission brightness for each block based on a brightness feature amount of image data of an inputted frame. In the example shown in FIG. 8, the displayed image is made up of a still image constituted by a main object region and a still image background region, a cursor, and a user operation menu. In addition, FIG. 8 shows a cursor being moved to a user operation button in a user operation menu (the cursor being moved from a position C1 to a position C2) in response to the use of a mouse by a user. In a conventional liquid crystal display apparatus, a backlight emission brightness of a block to which a cursor belongs is determined based on a brightness feature amount that includes a brightness feature amount of the cursor. Therefore, due to the cursor being displayed, the display brightness around the cursor varies specifically. For example, when an image of the cursor is a bright image, the backlight emission brightness of a block to which the cursor belongs becomes higher compared to a case where the cursor does not belong to the block. Therefore, the display brightness around the cursor increases specifically, and image quality around the cursor deteriorates. Such a variation in display brightness creates a feeling of discomfort in a user. In other words, such a variation in display brightness creates a feeling of interference in terms of image quality. In particular, such deterioration of image quality (a feeling of discomfort in a user and a feeling of interference in terms of image quality) becomes prominent in a still image background region that is a dark image region. In addition, when the cursor is moved, the deterioration of image quality (a feeling of discomfort in a user and a feeling of interference in terms of image quality) becomes prominent since a region in which the display brightness had specifically varied moves with the movement of the cursor.

Figure 2:
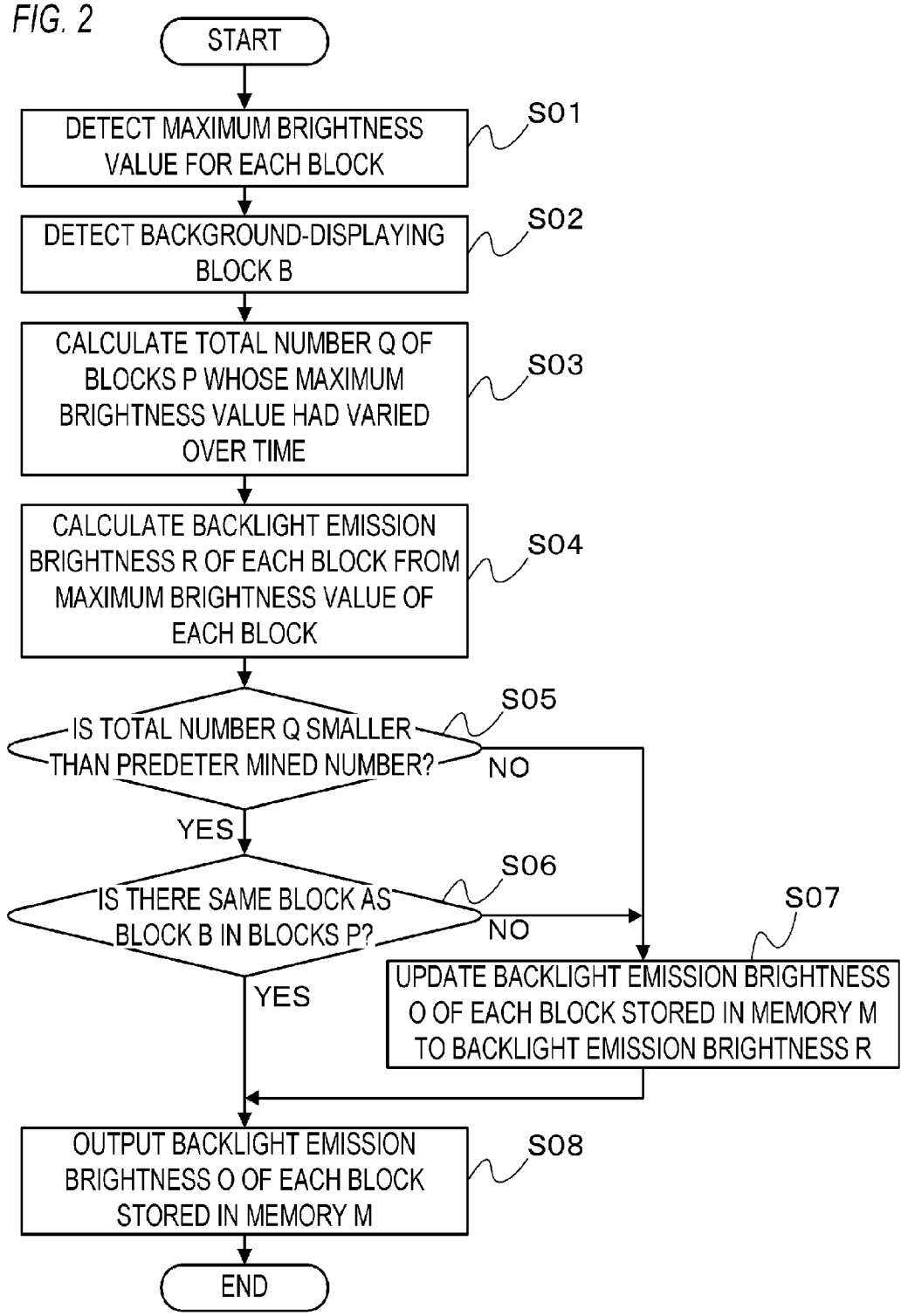
FIG. 2 is a flow chart showing an example of a processing flow of a liquid crystal display apparatus according to the first embodiment.

An example of a processing flow of the liquid crystal display apparatus according to the present embodiment will be specifically described with reference to the flow chart shown in FIG. 2. First, in step S01, for each block, the feature amount detecting unit 101 detects the maximum brightness value (maximum pixel value) of image data of the block from image data of a current frame as a brightness feature amount of the block. In step S02, the background detecting unit 102 detects a block in which the maximum brightness value of image data is equal to or smaller than a predetermined value in at least the current frame or a preceding frame as a block B (background-displaying block) belonging to a still image background region. Specifically, a block in which the maximum brightness value of image data is equal to or smaller than a predetermined value in the current frame may be set as the block B belonging to a still image background region, or a block in which the maximum brightness value of image data is equal to or smaller than a predetermined value in the preceding frame may be set as the block B belonging to a still image background region. In addition, a block in which the maximum brightness value of image data is equal to or smaller than a predetermined value in both the current frame and the preceding frame may be set as the block B belonging to a still image background region.

Next, in step S03, for each block, the feature amount variation detecting unit 103 calculates the difference value between the maximum brightness value of image data in the preceding frame and the maximum brightness value of image data in the current frame. In addition, the feature amount variation detecting unit 103 detects a block in which the difference value is equal to or larger than a predetermined value and, at the same time, the maximum brightness value of image data in the current frame is larger than the maximum brightness value of image data in the preceding frame as a block P in which a brightness feature amount has varied over time. Furthermore, the variation area calculating unit 104 calculates the total number Q of the blocks P.

In step S04, the backlight brightness calculating unit 105 calculates a backlight emission brightness R of each block from the maximum brightness values of the respective blocks detected in step S01. For example, the backlight brightness calculating unit 105 uses a lookup table (such as a function that determines a relationship between a maximum brightness value of image data and a backlight emission brightness) stored in advance to calculate the backlight emission brightness R of each block.

Next, in step S05, the variation area calculating unit 104 determines whether or not the total number Q calculated in step S03 is smaller than a predetermined number. When the total number Q is smaller than a predetermined number, the variation area calculating unit 104 determines that the variation of the brightness feature amount over time detected in step S03 is attributable to displaying of an auxiliary object. This is because the area of an auxiliary object, such as a cursor, is assumed to be relatively small. In addition, the variation area calculating unit 104 determines that the block P (a block in which the brightness feature amount has varied over time) detected in step S03 is a block in which an auxiliary object is displayed. In other words, in the present embodiment, when the number of blocks satisfying a condition that the maximum brightness value of image data in the current frame is larger than the maximum brightness value of image data in the preceding frame by a predetermined value or more is equal to or larger than one and smaller than a predetermined number, blocks that satisfy the condition are considered to be blocks in which the auxiliary object is displayed. The processing then proceeds to step S06. When the total number Q is equal to or larger than a predetermined number, the variation area calculating unit 104 determines that the variation of the brightness feature amount over time detected in step S03 is not attributable to displaying of an auxiliary object (for example, attributable to a change of a displayed image (still image)). The processing then proceeds to step S07.

In step S06, the backlight brightness variation control unit 106 determines whether the same block as the block B (background-displaying block) detected in step S02 is included in the blocks P (blocks in which the auxiliary object is displayed) detected in step S03. When the same block as the block B is included in the blocks P, the backlight brightness variation control unit 106 determines that the auxiliary object is now displayed in the background-displaying block (which is a block in which the auxiliary object had not been displayed in a preceding frame). The processing then proceeds to step S08. The processing also proceeds to step S08 when no blocks P have been detected in step S03 (when the total number Q is 0). In this case, the backlight brightness variation control unit 106 determines that the image data of the current frame and the image data in the preceding frame are the same or that the block in which the auxiliary object is displayed is the same in the current frame and the preceding frame. When a same block as the block B is not included in the blocks P, the backlight brightness variation control unit 106 determines that the auxiliary object has been displayed in a block (a block in which the auxiliary object had not been displayed in the preceding frame) other than the background-displaying block. Even if the auxiliary object is displayed at such a position, the deterioration of image quality described earlier does not occur easily. In other words, even if the auxiliary object is displayed at such a position, the feeling of discomfort in a user (the feeling of interference in terms of image quality) described earlier is low. Therefore, in such a case, the processing proceeds to step S07.

In step S07, the backlight brightness variation control unit 106 replaces the backlight emission brightness O for each block stored in a memory M of the backlight brightness storage unit 107 with the backlight emission brightness R for each block calculated in step S04. The processing then proceeds to step S08. In step S08, the backlight brightness variation control unit 106 outputs the backlight emission brightness O for each block stored in the memory M of the backlight brightness storage unit 107 to the backlight control value calculating unit 108 and the gain calculating unit 110. At this point, the backlight emission brightness O for each block stored in the memory M is not released and is retained. Therefore, in the present embodiment, when it is determined that a cursor or the like is displayed in the background-displaying block, the backlight emission brightness O for each block stored in the memory M is retained without being updated. In addition, the backlight emission brightness O for each block stored in the memory M is also retained without being updated when no blocks P have been detected in step S03 (when the total number Q is 0).

The backlight control value calculating unit 108 then calculates a control value for each block from the backlight emission brightness O acquired for each block and outputs the control value. As a result, when it is determined that the auxiliary object is displayed in the background-displaying block, the light sources (the light source of the backlight 109) of all blocks respectively emit light at a backlight emission brightness of the blocks in a preceding frame. When it is determined that the auxiliary object is displayed in a block other than a background-displaying block or when it is determined that a variation of the brightness feature amount over time is not attributable to displaying the auxiliary object, the backlight 109 emits light by a method similar to that conventionally used. Specifically, for each block, the light source of the backlight 109 emits light at a backlight emission brightness based on the brightness feature amount of the image data in the current frame. In addition, the gain calculating unit 110 calculates the gain using the backlight emission brightness O acquired for each block and outputs the gain to the gain multiplying unit 111. The gain multiplying unit 111 multiplies the image data of the current frame by the acquired gain and outputs the image data multiplied by the gain to the liquid crystal panel 112. Accordingly, the transmittance of each liquid crystal element of the liquid crystal panel 112 is controlled based on the image data multiplied by the gain.

As described above, according to the present embodiment, when it is determined that the auxiliary object is displayed in a background-displaying block, the backlight emission brightness of the background-displaying block in which the auxiliary object is displayed is set so as to equal the backlight emission brightness of the block in a previous frame. As a result, the backlight emission brightness of the background-displaying block in which the auxiliary object is displayed can be approximated to the backlight emission brightness of other background-displaying blocks. In addition, as shown in FIG. 3, when the auxiliary object is displayed in the background-displaying block, a specific variation (image quality deterioration) of the display brightness around the object can be suppressed. In other words, the deterioration of image quality around the predetermined object can be suppressed, and the image quality of a displayed image can be improved.

Moreover, while a case where a brightness feature amount is the maximum brightness value (maximum pixel value) has been exemplified in the present embodiment, the brightness feature amount is not limited thereto. The brightness feature amount may be an average brightness value (average pixel value), a mode brightness value (mode pixel value), or a brightness histogram. Using such a brightness feature amount enables the variation of the brightness feature amount over time to be detected with higher accuracy than in a case where the a maximum brightness value is used as the brightness feature amount. Moreover, while the present embodiment is configured such that the backlight emission brightness of a background-displaying block in which an auxiliary object is displayed is set equal to a backlight emission brightness of the same block in a previous frame, the present invention is not limited to such a configuration. Alternatively, a configuration may be adopted in which a backlight emission brightness of a background-displaying block in which an auxiliary object is displayed is approximated to a backlight emission brightness of the same block in a previous frame. Even with such a configuration, an effect similar to that described above can be achieved.

Moreover, while the present embodiment is configured such that the backlight emission brightness O for each block stored in a memory M is retained without being updated when it is determined that image data of a current frame and image data of a preceding frame are the same, the present invention is not limited to such a configuration. For example, determinations can be made independently regarding whether or not image data of the current frame and image data of the preceding frame are the same and whether or not an auxiliary object is displayed in a background-displaying block. The backlight emission brightness O for each block stored in the memory M may be updated when it is determined that image data of the current frame and image data of the preceding frame are the same and, at the same time, an auxiliary object is not displayed in a background-displaying block. For example, whether or not image data of the current frame and image data of the preceding frame are the same can be determined by comparing the image data of the current frame and the image data of the preceding frame with each other. Specifically, the image data of the current frame and the image data of the preceding frame may be determined to be the same when the total number Q is zero, and the image data of the current frame and the image data of the preceding frame may be determined not to be the same when the total number Q is larger than zero. In addition, for example, whether or not an auxiliary object is displayed in a background-displaying block may be determined separately from the determination regarding whether or not image data of the current frame and image data of the preceding frame are the same by using a method according to a third embodiment (to be described later).

Moreover, while a block in which the maximum brightness value of image data in at least a current frame or a preceding frame is equal to or smaller than a predetermined value is considered to be a background-displaying block in the present embodiment, the method of detecting a background-displaying block is not limited thereto. For example, a block in which the maximum brightness value of image data in the current frame is equal to or smaller than a predetermined value may be assumed to be a background-displaying block. In addition, as a condition applied when determining that a block of interest (a block that is a target of determination) is a background-displaying block, a condition that the maximum brightness value of an image in a block adjacent to the block of interest is also equal to or smaller than a predetermined value or a condition that a brightness feature amount of the block of interest does not vary over time may be used. Furthermore, the average brightness value may be used in place of a maximum brightness value. For example, a block in which the average brightness value of image data in at least a current frame or a preceding frame is equal to or smaller than a predetermined value may be assumed to be a background-displaying block. As a condition applied when determining that a block of interest is a background-displaying block, a condition that pixel values in the block of interest are approximately constant or flat (pixel values of the block of interest are concentrated in a part of pixel values) may be used. Furthermore, the background may be a black bar portion in side panel image data or letterbox image data. In addition, in a case where a user has masked a region that is not of interest in an image with a black image by using an image viewer function or the like in order to improve image visibility, the masked region may be used as the background. When detecting a block in such regions (a black bar portion or a region masked by the user) as a background-displaying block, the background-displaying block can be detected by referring to information acquired from the outside. Examples of information acquired from the outside include a genre of an image (whether or not an image is a cinematic video), positional information of a black bar portion, and positional information of a region masked by the user. Furthermore, the color of a background need not be limited to black. Any color may be used for the background. For example, the background may be gray or blue.

Moreover, the present embodiment is configured such that when the same block as the block B is included in the blocks P, it is determined that an auxiliary object has been displayed in a background-displaying block (that is a block in which the auxiliary object had not been displayed in a preceding frame). However, the present invention is not limited to such a configuration. For example, when the number of background-displaying blocks among a plurality of blocks adjacent to a block in which the auxiliary object is displayed (a block whose brightness feature amount has varied over time) is equal to or larger than a predetermined number, it may be determined that an auxiliary object is displayed in a background-displaying block. A previous (for example, when the auxiliary object had not been displayed) result of detection of a background-displaying block may be stored in advance, and a determination regarding whether or not the auxiliary object is displayed in the background-displaying block may be made based on the detection result. Specifically, when a block in which the auxiliary object is displayed has been a background-displaying block in a previous frame, it may be determined that the auxiliary object is displayed in a background-displaying block. Moreover, a background-displaying block, in which an auxiliary object is displayed, may be identified. For example, when the same block as the block B is included in the blocks P, the same block P as the block B may be identified as a background-displaying block in which an auxiliary object is displayed. A block in which an auxiliary object is displayed when the number of background-displaying blocks among a plurality of blocks adjacent to a block in which the auxiliary object is displayed is equal to or larger than a predetermined number may be identified as a background-displaying block in which an auxiliary object is displayed. A block in which an auxiliary object is displayed may be identified as a background-displaying block in which an auxiliary object is displayed when the block in which the auxiliary object is displayed has been a background-displaying block in a previous frame.

Moreover, the method of calculating a gain by the gain calculating unit 110 is not particularly restrictive. An example will be described below. The gain calculating unit 110 stores, in advance, data representing a display brightness distribution when, for each block, light is emitted only from a light source (a light source of the backlight) of the block at a predetermined emission brightness to display a uniform image, and which is a display brightness distribution normalized by a display brightness at a position of the block. Such a position of each block is, for example, a center position of the block. For each block, the gain calculating unit 110 multiplies the aforementioned data (data representing a distribution of normalized display brightness) of the block by a backlight emission brightness (a backlight emission brightness outputted from the backlight brightness storage unit 107) of the block. Accordingly, a distribution of the backlight emission brightness when, for each block, light is emitted only from a light source (a light source of the backlight) of the block at the backlight emission brightness outputted from the backlight brightness storage unit 107 is obtained. In addition, the gain calculating unit 110 merges (adds up) the emission brightness distributions of the respective blocks. Accordingly, the distribution of the backlight emission brightness when light is emitted from the light sources of all blocks at the backlight emission brightness outputted from the backlight brightness storage unit 107 (a first emission brightness distribution) is obtained. Subsequently, the gain calculating unit 110 calculates a first display brightness distribution from the first emission brightness distribution and predetermined image data (a transmittance of each pixel in accordance with predetermined image data). Specifically, as the first display brightness distribution, a distribution of display brightness when light is emitted from the light sources of all blocks at the backlight emission brightness outputted from the backlight brightness storage unit 107 to display an image in accordance with predetermined image data is calculated. Moreover, the predetermined image data may or may not be a signal of the uniform image described above. The predetermined image data may be inputted image data of a current frame. In a similar manner, for each block, the gain calculating unit 110 multiplies the data described above of the block by a predetermined emission brightness. Accordingly, a distribution of the backlight emission brightness when, for each block, light is emitted only from a light source (a light source of the backlight) of the block at a predetermined emission brightness is obtained. In addition, the gain calculating unit 110 merges (adds up) the emission brightness distributions of the respective blocks. Accordingly, the distribution of the backlight emission brightness when light is emitted from the light sources of all blocks at a predetermined emission brightness (a second emission brightness distribution) is obtained. Subsequently, the gain calculating unit 110 calculates a second display brightness distribution from the second emission brightness distribution and the predetermined image data described above. Specifically, as the second display brightness distribution, the distribution of display brightness when light is emitted from the light sources of all blocks at the predetermined emission brightness to display an image in accordance with predetermined image data is calculated. The gain calculating unit 110 then calculates the gain by dividing the maximum value of the second display brightness by the maximum value of the first display brightness.

Moreover, in a case where it is determined that an auxiliary object is displayed in a background-displaying block, there is a risk that the visibility of the auxiliary object may decline when the backlight emission brightness of the background-displaying block in which the auxiliary object is displayed is adopted as a backlight emission brightness of a background-displaying block in which the auxiliary object is not displayed. For example, when the backlight emission brightness of a background-displaying block in which the auxiliary object is not displayed is low, the display brightness of the auxiliary object decreases and the visibility of the auxiliary object declines. Therefore, the backlight emission brightness of the background-displaying block in which the auxiliary object is displayed is favorably set smaller than the backlight emission brightness determined based on an image of the block and, at the same time, higher than a backlight emission brightness determined based on an image of a background-displaying block in which the auxiliary object is not displayed. Accordingly, a decline in the visibility of the auxiliary object can be suppressed. Here, an "image of a background-displaying block in which the auxiliary object is not displayed" is an image of a background-displaying block in which the auxiliary object is not displayed in the current frame or an image of a background-displaying block in which the auxiliary object is displayed in a previous frame.

Moreover, while a case where an image of the auxiliary object is brighter than an image of the background has been exemplified in the present embodiment, images of the auxiliary object and the background are not limited thereto. For example, the background may be a bright image and the auxiliary object may be a dark image. When the image of the auxiliary object is darker than the image of the background, for example, the minimum brightness value of the image may be adopted as a brightness feature amount. In addition, a block in which a minimum brightness value of image data in at least a current frame or a preceding frame is equal to or larger than a predetermined value may be detected as a background-displaying block. When the number of blocks satisfying the condition that the minimum brightness value of image data in the current frame is smaller by a predetermined value or more than the minimum brightness value of image data in the preceding frame is equal to or larger than one and smaller than a predetermined number, blocks that satisfy the condition may be adopted as blocks in which the auxiliary object is displayed.

Figure 4:
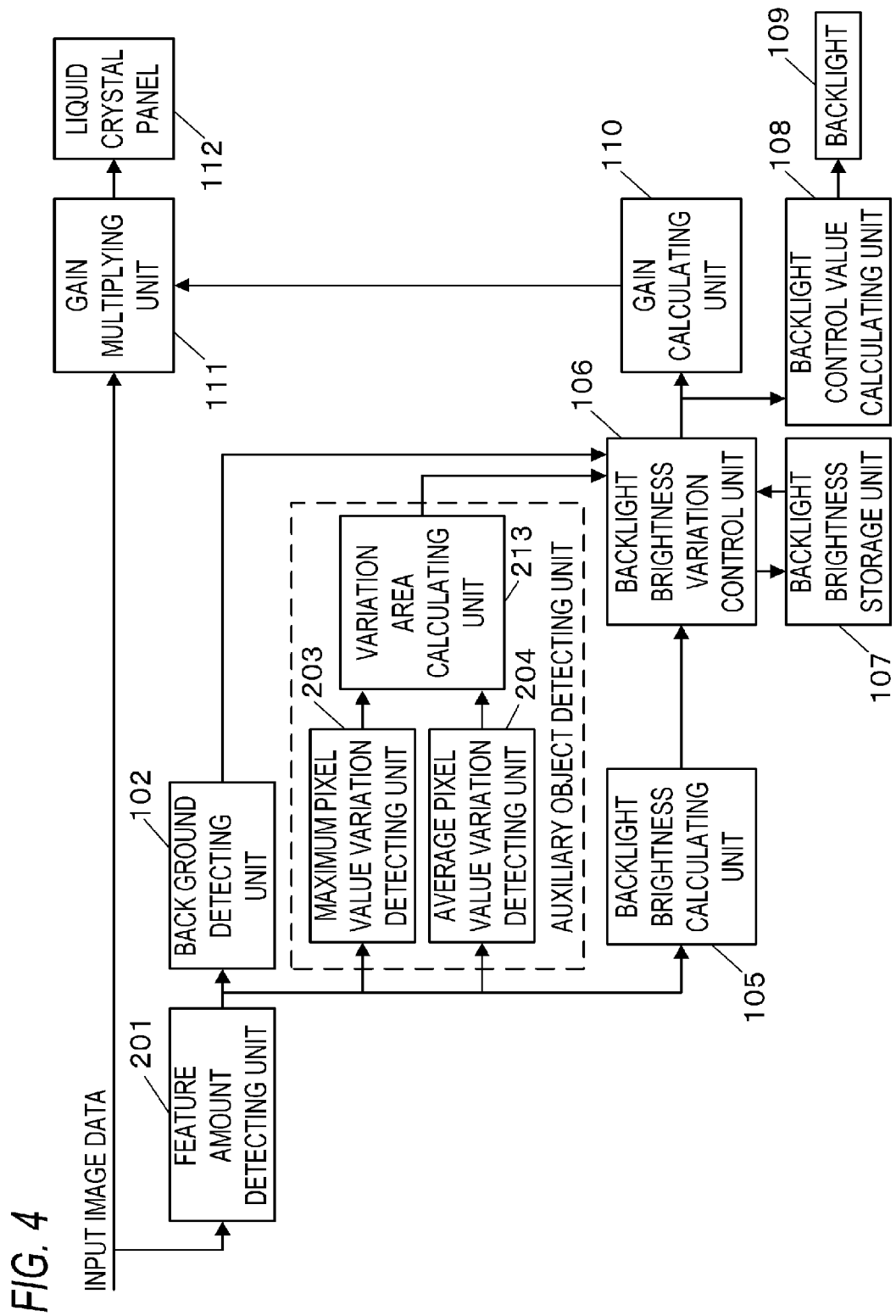
FIG. 4 is a block diagram showing an example of a functional configuration of a liquid crystal display apparatus according to a second embodiment.

Hereinafter, a liquid crystal display apparatus and a control method thereof according to a second embodiment of the present invention will be described. For example, in a similar manner to the first embodiment, the liquid crystal display apparatus according to the present embodiment displays an image including a still image, a user operation menu, and an auxiliary object. Moreover, a case where an image of the auxiliary object is brighter than an image of a background will be described below. FIG. 4 is a block diagram showing an example of a functional configuration of the liquid crystal display apparatus according to the present embodiment. The same functions as those of the first embodiment (FIG. 1) are denoted by the same reference signs and descriptions thereof will be omitted.

A feature amount detecting unit 201 detects, for each block, the maximum brightness value (maximum pixel value) and the average brightness value (average pixel value) of an image of the block from image data of an inputted frame (current frame) as a brightness feature amount of the block. A maximum pixel value variation detecting unit 203 detects blocks in which the maximum brightness value of image data has varied over time, and outputs a detection result. Specifically, the maximum pixel value variation detecting unit 203 detects blocks in which the maximum brightness value of image data in a current frame is larger than the maximum brightness value of image data in a preceding frame by a predetermined value or more, and outputs a detection result. An average pixel value variation detecting unit 204 detects blocks in which the average brightness value of image data has varied over time, and outputs a detection result. Specifically, the average pixel value variation detecting unit 204 detects blocks in which the difference between the average brightness value of image data in the current frame and the average brightness value of image data in the preceding frame is equal to or larger than a predetermined value, and outputs a detection result. A variation area calculating unit 213 calculates a total area (number) of blocks that have been detected by the maximum pixel value variation detecting unit 203 and, at the same time, have not been detected by the average pixel value variation detecting unit 204. In other words, the total area (number) of blocks is calculated in which the maximum brightness value of image data in the current frame is larger than the maximum brightness value of image data in the preceding frame by a predetermined value or more and, at the same time, the difference between the average brightness value of image data in the current frame and the average brightness value of image data in the preceding frame is smaller than a predetermined value. Subsequently, regarding blocks satisfying the condition that the maximum brightness value of image data in the current frame is larger than the maximum brightness value of image data in the preceding frame by a predetermined value or more and, at the same time, the difference between the average brightness value of image data in the current frame and the average brightness value of image data in the preceding frame is smaller than a predetermined value, when the number of blocks satisfying the condition is smaller than a predetermined number, the variation area calculating unit 213 determines that the blocks satisfying the condition are blocks in which an auxiliary object is displayed and outputs a determination result.

The size of an auxiliary object, such as a cursor, is often relatively small. Therefore, it is conceivable that the average brightness value of image data does not significantly vary even when an auxiliary object is displayed. In other words, when the maximum brightness value of image data varies significantly over time and the average brightness value of the image data also varies significantly over time, it is conceivable that the variation of the maximum brightness value over time is not caused by displaying an auxiliary object. Therefore, in the present embodiment, as described above, when the number of blocks satisfying a condition that the maximum brightness value of image data in the current frame is larger than the maximum brightness value of image data in the preceding frame by a predetermined value or more and, at the same time, the difference between the average brightness value of image data in the current frame and the average brightness value of image data in the preceding frame is smaller than a predetermined value is equal to or larger than one and smaller than a predetermined number, the blocks satisfying the condition are assumed to be blocks in which an auxiliary object is displayed. Accordingly, blocks in which an auxiliary object is displayed can be detected with higher accuracy than in the first embodiment.

Figure 5:
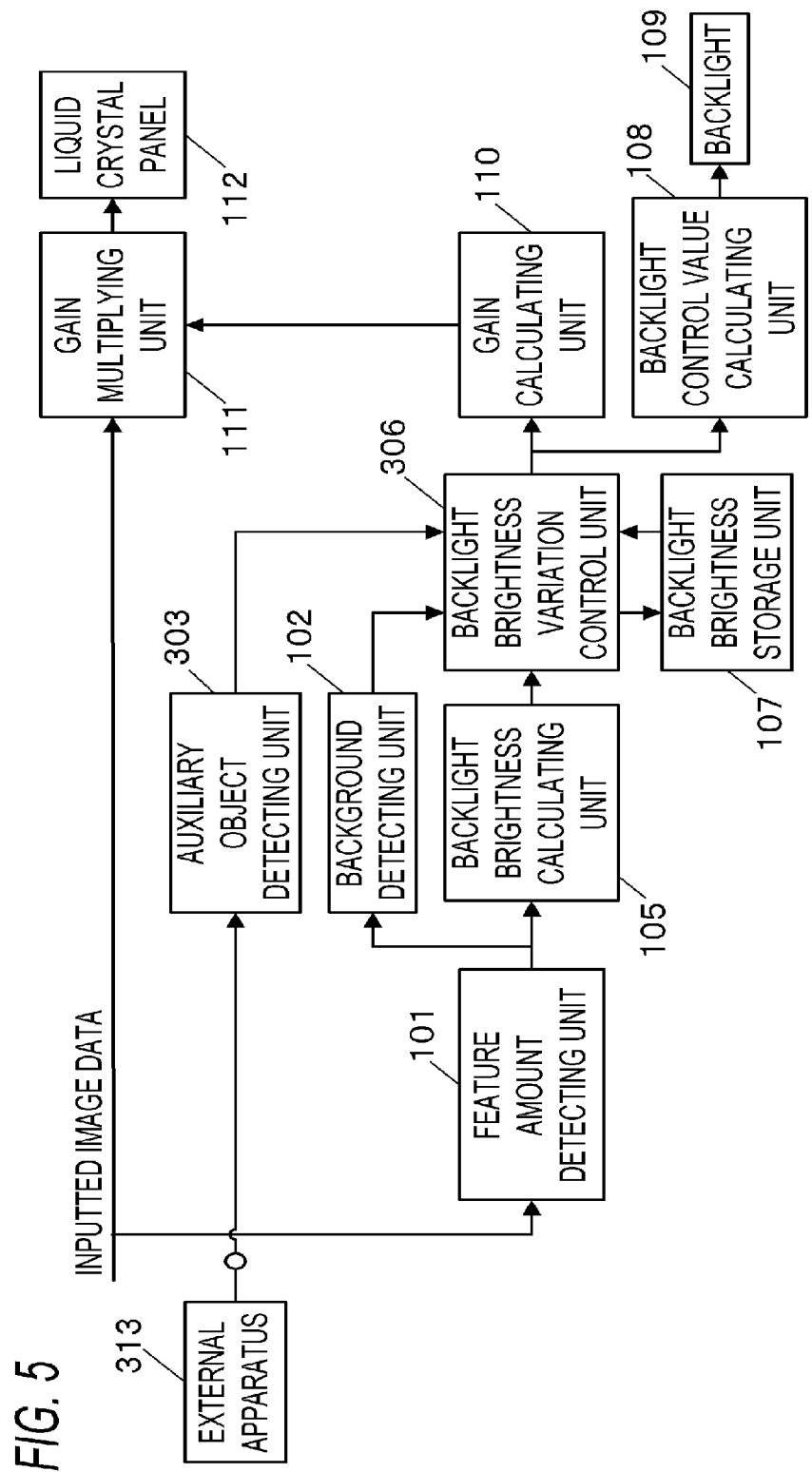
FIG. 5 is a block diagram showing an example of a functional configuration of a liquid crystal display apparatus according to a third embodiment.

Hereinafter, a liquid crystal display apparatus and a control method thereof according to a third embodiment of the present invention will be described. Unlike the first and second embodiments, the image display apparatus according to the present embodiment is also capable of displaying moving images. In other words, the image display apparatus according to the present embodiment displays an image including one of or both a moving image and a still image, and an auxiliary object. FIG. 5 is a block diagram showing an example of a functional configuration of the liquid crystal display apparatus according to the present embodiment. The same functions as those of the first embodiment (FIG. 1) are denoted by the same reference signs and descriptions thereof will be omitted.

An external apparatus 313 is an external device that outputs positional information indicating an overlapping position of an auxiliary object in a displayed image. For example, the external apparatus 313 is a PC. For example, positional information of an auxiliary object is coordinate data which represents a displayed position of a mouse cursor and which is managed by an operating system running on the PC. An auxiliary object detecting unit 303 detects a block in which an auxiliary object is displayed based on positional information of the auxiliary object which is inputted from the external apparatus 313 that is separate from the liquid crystal display apparatus according to the present embodiment. Specifically, when the positional information of an auxiliary object is a coordinate of a display position of the auxiliary object, a block including the coordinate is assumed to be the block in which the auxiliary object is displayed. When it is determined that the auxiliary object is displayed in a background-displaying block, a backlight brightness variation control unit 306 adjusts the backlight emission brightness of the background-displaying block in which the auxiliary object is displayed so as to approximate (or become equal to) the backlight emission brightness in the same block in a previous frame.

As described above, according to the present embodiment, a block in which an auxiliary object is displayed is detected based on positional information of the auxiliary object that is inputted from an external device without using image data (brightness feature amount). Accordingly, blocks in which an auxiliary object is displayed can be detected with higher accuracy than in other embodiments. In addition, in the present embodiment, the total area of blocks whose brightness feature amount has varied over time need not be used to detect a block in which an auxiliary object is displayed as was the case in the first and second embodiments. Therefore, an auxiliary object that overlaps a moving image can also be detected. Furthermore, in the present embodiment, when it is determined that the auxiliary object is displayed in a background-displaying block, the backlight emission brightness of the background-displaying block in which the auxiliary object is displayed is set so as to equal the backlight emission brightness of the same block in a previous frame. Therefore, since the backlight emission brightness can be controlled based on image data of an inputted frame in blocks other than the background-displaying block in which the auxiliary object is displayed, contrast can be improved even when the auxiliary object is being displayed.

Figure 6:
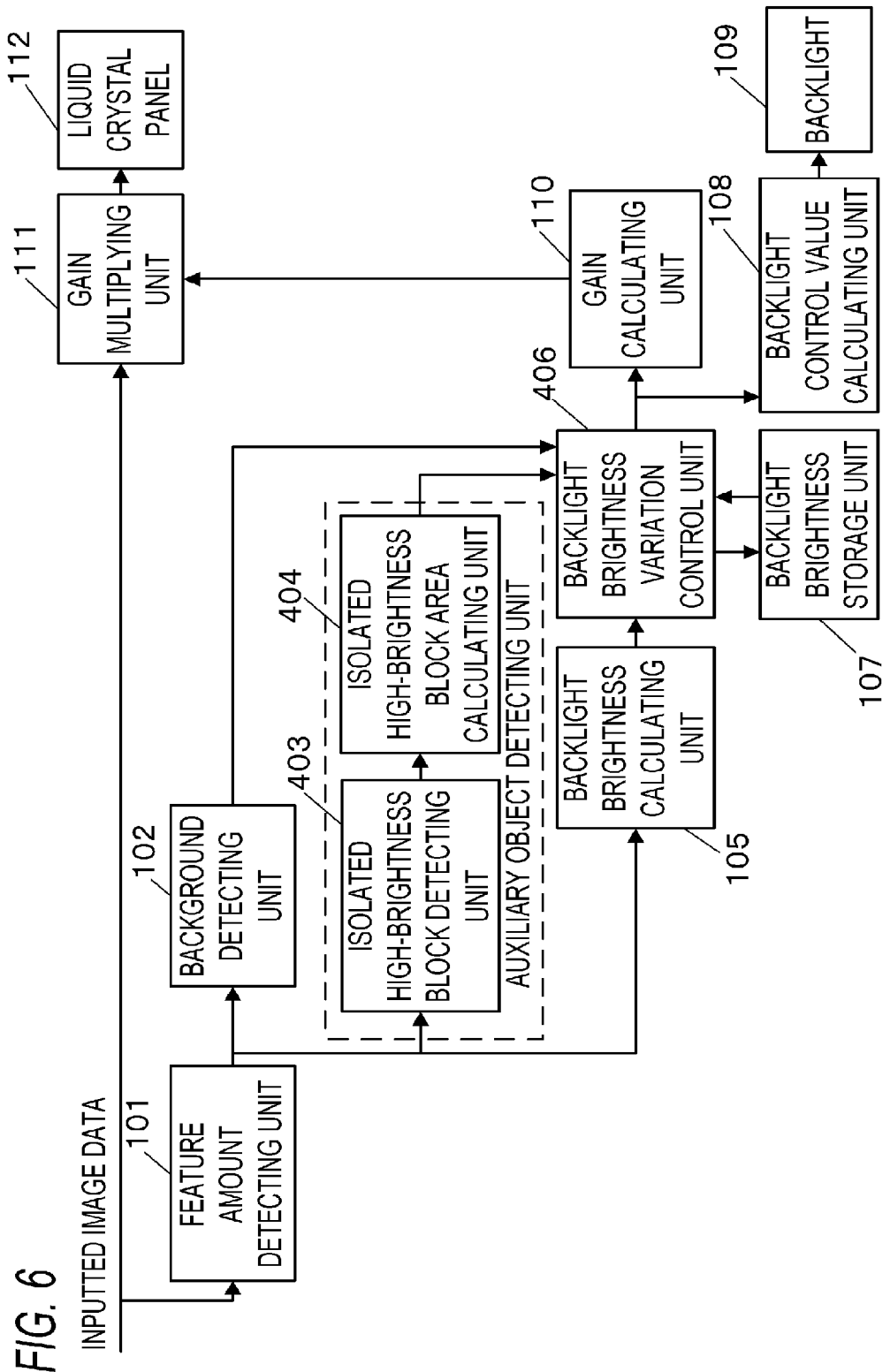
FIG. 6 is a block diagram showing an example of a functional configuration of a liquid crystal display apparatus according to a fourth embodiment.

Hereinafter, a liquid crystal display apparatus and a control method thereof according to a fourth embodiment of the present invention will be described. For example, an image display apparatus according to the present embodiment displays an image including one of or both a moving image and a still image, and an auxiliary object in a similar manner to the third embodiment. Moreover, a case will be described below in which an image of an auxiliary object is brighter than a background image. FIG. 6 is a block diagram showing an example of a functional configuration of the liquid crystal display apparatus according to the present embodiment. The same functions as those of the first embodiment (FIG. 1) are denoted by the same reference signs and descriptions thereof will be omitted.

An isolated high-brightness block detecting unit 403 detects blocks in which the brightness value (a maximum brightness value, a minimum brightness value, a mode brightness value, an average brightness value, or the like) of image data is higher than a predetermined value and, at the same time, brightness values of images in all adjacent blocks are smaller than a predetermined value as an isolated high-brightness block. An isolated high-brightness block area calculating unit 404 calculates the total area (number) of isolated high-brightness blocks detected by the isolated high-brightness block detecting unit 403. In addition, when the number of isolated high-brightness blocks is equal to or larger than one and smaller than a predetermined number, the isolated high-brightness block area calculating unit 404 determines that the isolated high-brightness blocks are blocks in which an auxiliary object is displayed, and outputs a determination result. When it is determined that the auxiliary object is displayed in a background-displaying block, a backlight brightness variation control unit 406 determines the backlight emission brightness of the background-displaying block in which the auxiliary object is displayed based on the backlight emission brightness of an adjacent background-displaying block. For example, as the backlight emission brightness of the background-displaying block in which the auxiliary object is displayed, the backlight emission brightness of any one of adjacent background-displaying blocks may be adopted. Moreover, as the backlight emission brightness of the background-displaying block in which the auxiliary object is displayed, a mode value or a mean value of the backlight emission brightness of the adjacent background-displaying blocks may be adopted. A configuration may be adopted in which the backlight emission brightness of the background-displaying block in which the auxiliary object is displayed is approximated to the backlight emission brightness of the adjacent background-displaying blocks, a mode value thereof, or a mean value thereof.

As described above, according to the present embodiment, when it is determined that the auxiliary object is displayed in a background-displaying block, the backlight emission brightness of the background-displaying block in which the auxiliary object is displayed is determined based on the backlight emission brightness of an adjacent background-displaying block. Accordingly, the backlight emission brightness of the background-displaying block in which the auxiliary object is displayed can be approximated to the backlight emission brightness of other background-displaying blocks. In addition, when the auxiliary object is displayed in the background-displaying block, a specific variation (image quality deterioration) of the display brightness around the object can be suppressed. In other words, deterioration of image quality around the predetermined object can be suppressed, and the image quality of a displayed image can be improved.

Figure 7:
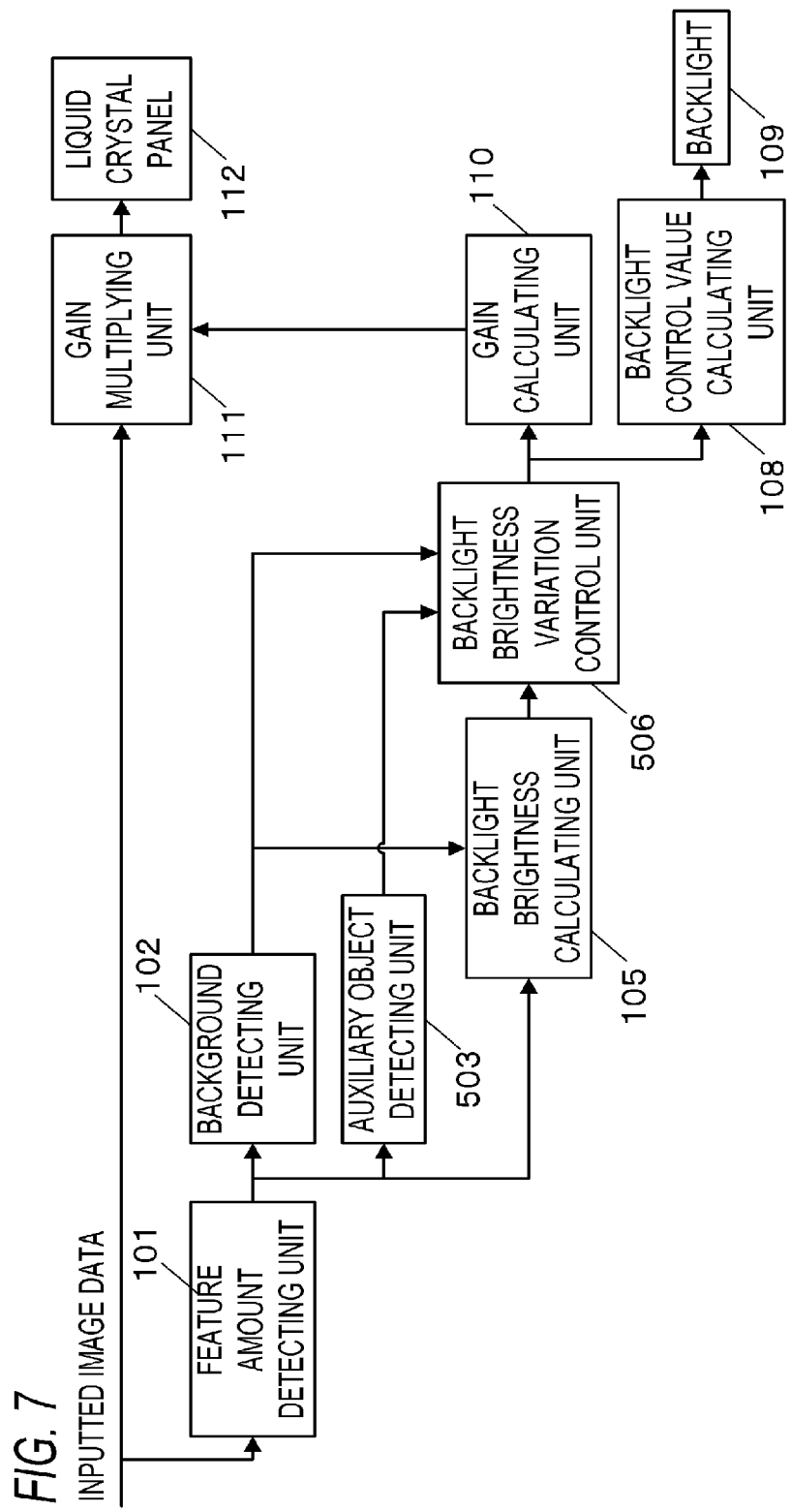
FIG. 7 is a block diagram showing an example of a functional configuration of a liquid crystal display apparatus according to a fifth embodiment.

Hereinafter, a liquid crystal display apparatus and a control method thereof according to a fifth embodiment of the present invention will be described. For example, an image display apparatus according to the present embodiment displays an image including one of or both a moving image and a still image, and an auxiliary object in a similar manner to the third and fourth embodiments. FIG. 7 is a block diagram showing an example of a functional configuration of the liquid crystal display apparatus according to the present embodiment. The same functions as those of the first embodiment (FIG. 1) are denoted by the same reference signs and descriptions thereof will be omitted.

An auxiliary object detecting unit 503 detects a block in which an auxiliary object is displayed using the same method as in the first, second, and fourth embodiments. When it is determined that the auxiliary object is displayed in a background-displaying block (when the object block exists), a backlight brightness variation control unit 506 adjusts the backlight emission brightness of all background-displaying block so as to be equal to each other. Specifically, the backlight emission brightness of all background-displaying blocks is set to a predetermined value. For example, the predetermined value is a backlight emission brightness that is determined based on an image of a background-displaying block in which the auxiliary object is not displayed. Moreover, the predetermined value is not limited thereto. A value that is smaller than a backlight emission brightness that is determined based on an image of a background-displaying block in which the auxiliary object is displayed and, at the same time, higher than a backlight emission brightness that is determined based on an image of a background-displaying block in which the auxiliary object is not displayed may be adopted as the predetermined value. By adopting such a configuration, the decline in visibility of the auxiliary object can be suppressed. Alternatively, the predetermined value described above may be controlled by calculating the area of a background (or a total area (number) of blocks in which the background is displayed) and setting the predetermined value so that the larger the area, the larger the predetermined value.

As described above, according to the present embodiment, when it is determined that an auxiliary object is displayed in a background-displaying block, the backlight emission brightness of all background-displaying blocks is adjusted so as to be equal to each other. Accordingly, when the auxiliary object is displayed in a background-displaying block, a specific variation (image quality deterioration) of the display brightness around the object can be suppressed.

Moreover, the respective functions of the first to fifth embodiments are interchangeable wherever possible. For example, the auxiliary object detecting unit 303 according to the third embodiment may be used in place of the feature amount variation detecting unit 103 and the variation area calculating unit 104 according to the first embodiment. The backlight brightness variation control unit 306 according to the third embodiment may be used in place of the backlight brightness variation control unit 106 according to the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-277625, filed on Dec. 19, 2011, and Japanese Patent Application No. 2012-257472, filed on Nov. 26, 2012, which are hereby incorporated by reference herein in their entirety.

REFERENCE SIGNS LIST 102 background detecting unit
103 feature amount variation detecting unit
104, 213 variation area calculating unit
106, 306, 406, 506 backlight brightness variation control unit
203 maximum pixel value variation detecting unit
204 average pixel value variation detecting unit
303, 503 auxiliary object detecting unit
403 isolated high-brightness block detecting unit
404 isolated high-brightness block area calculating unit

The invention claimed is:

1. An image display apparatus capable of controlling emission brightnesses of a plurality of light sources configuring a backlight on the basis of input image data, the image display apparatus comprising:
a control unit configured to control the emission brightness of each of the plurality of light sources corresponding to a plurality of blocks configuring a region of a screen, according to a characteristic value of each image displayed in each of the plurality of blocks;
a detecting unit configured to detect a background block that is a block in which a background image is displayed, on the basis of the characteristic value of each image displayed in each of the plurality of blocks; and
a determining unit configured to determine an object block that is a block in which a predetermined object is displayed,
wherein when the background block detected by the detecting unit changes to the object block, the control unit does not change the emission brightness of this object block from the emission brightness according to the characteristic value of the background image displayed in this background block.

2. An image display apparatus capable of controlling emission brightnesses of a plurality of light sources configuring a backlight, the image display apparatus comprising:
a control unit configured to control the emission brightness of each of the plurality of light sources corresponding to a plurality of blocks configuring a region of a screen, according to a characteristic value of each image displayed in each of the plurality of blocks; and
a detecting unit configured to detect an object block that is a block whose state changes from a state where a predetermined object is not displayed to a state where the predetermined object is displayed, on the bases of image data of an inputted first frame and image data of a second frame before the first frame,
wherein when the object block is detected, the control unit does not change the emission brightness of this object block from the emission brightness according to the characteristic value of the image displayed in this object block in the state where the predetermined object is not displayed.

3. The image display apparatus according to claim 1, wherein when the background block detected by the detecting unit in a second frame before a first frame of the input image data changes to the object block in the first frame, the control unit does not change the emission brightnesses of all blocks in the first frame from the emission brightnesses of in the second frame.

4. The image display apparatus according to claim 3, wherein the second frame is a frame immediately preceding the first frame.

5. The image display apparatus according to claim 1, wherein the characteristic value includes a maximum brightness value, and the detecting unit detects, as the background block, a block whose image displayed therein has the maximum brightness value that is a predetermined brightness value or less from among the plurality of blocks.

6. The image display apparatus according to claim 1, wherein the characteristic value includes an average brightness value, and the detecting unit detects, as the background block, a block whose image displayed therein has the average brightness value that is a predetermined brightness value or less from among the plurality of blocks.

7. The image display apparatus according to claim 1, wherein when the object block exists, the control unit controls the emission brightnesses of all blocks in which the background image is displayed, to be the same.

8. The image display apparatus according to claim 1, wherein the predetermined object is brighter than the background.

9. The image display apparatus according to claim 1, wherein when the number of changing blocks, each of which is a block satisfying a condition that the characteristic value of the image displayed in this block changes by a predetermined value or more from among the plurality of blocks is smaller than a predetermined number, the determining unit determines each of these changing blocks as the object block.

10. The image display apparatus according to claim 1, wherein the characteristic value includes a maximum brightness value, and when the number of changing blocks, each of which is a block satisfying a condition that the maximum brightness value of the image displayed in this block changes by a predetermined value or more from among the plurality of blocks smaller than a predetermined number, the determining unit determines each of these changing blocks as the object block.

11. The image display apparatus according to claim 1, wherein the characteristic value includes a maximum brightness value and an average brightness value, and when the number of changing blocks, each of which is a block satisfying a condition that the maximum brightness value of the image displayed in this block changes by a predetermined value or more and a condition that the average brightness value of image displayed in this block does not change by the predetermined value or more from among the plurality of block is smaller than a predetermined number, the determining unit determines each of these changing blocks as the object block.

12. The image display apparatus according to claim 1, wherein when the number of changing blocks, each of which is a block that is satisfying a condition that the characteristic value of the image displayed in this block changes by a predetermined value or more and a condition that a first predetermined number or more of the background blocks adjacent to this block from among the plurality of blocks is smaller than a second predetermined number, the determining unit determines each of these changing blocks as the object block.

13. The image display apparatus according to claim 1, wherein the predetermined object is a cursor for a user operation.

14. A control method of an image display apparatus capable of controlling emission brightnesses of a plurality of light sources configuring a backlight on the basis of input image data, the control method comprising:
- a control step of controlling the emission brightness of each of the plurality of light sources corresponding to a plurality of blocks configuring a region of a screen, according to a characteristic value of each image displayed in each of the plurality of blocks;
- a detecting step of detecting a background block that is a block in which a background image is displayed, on the basis of the characteristic value of each image displayed in each of the plurality of blocks;
- a determining step of determining an object block that is a block in which a predetermined object is displayed,
- wherein when the background block detected in the detecting step changes to the object block, in the control step, the emission brightness of this object block is not changed from the emission brightness according to the characteristic value of the background image displayed in this background block.

15. A control method of an image display apparatus capable of controlling emission brightnesses of a plurality of light sources configuring a backlight on the basis of input image, the control method comprising:
- a control step of controlling the emission brightness of each of the plurality of light sources corresponding to a plurality of blocks configuring a region of a screen, according to a characteristic value of each image displayed in each of the plurality of blocks; and
- a detecting step of detecting an object block that is a block whose state changes from a state where a predetermined object is not displayed to a state where the predetermined object is displayed, on the bases of an image data of an inputted first frame and an image data of a second frame before the first frame,
- wherein when the object block is detected in the control step, the emission brightness of this object block is not changed from the emission brightness according to the characteristic value of the image displayed in this background block in the state where the predetermined object is not displayed.

16. The image display apparatus according to claim 2, wherein when the object block is detected, the control unit does not change the emission brightnesses of all blocks in the first frame from the emission brightnesses in the second frame.

17. The image display apparatus according to claim 2, wherein the second frame is a frame immediately preceding the first frame.

18. The image display apparatus according to claim 2, wherein when the number of changing blocks, each of which is a block satisfying a condition that the characteristic value of the image displayed in this block changes by a predetermined value or more from among the plurality of blocks is smaller than a predetermined number, the detecting unit detects each of these changing blocks as the object block.

19. The image display apparatus according to claim 2, wherein the characteristic value includes a maximum brightness value, and when the number of changing blocks each of which is a block satisfying a condition that the maximum brightness value of the image displayed in this block changes by a predetermined value or more from among the plurality of blocks is smaller than a predetermined number, the detecting unit detects each of these changing blocks as the object block.

20. The image display apparatus according to claim 2, wherein the characteristic value includes a maximum brightness value and an average brightness value, and when the number of changing blocks each of which is a block satisfying a condition that the maximum brightness value of the image displayed in this block changes by a predetermined value or more and a condition that the average brightness value of the image displayed in this block does not change by the predetermined value or more from among the plurality of blocks is smaller than a predetermined number, the detecting unit detects each of these changing blocks as the object block.

21. The image display apparatus according to claim 2, wherein the predetermined object is a cursor for a user operation.

* * * * *